July 9, 1946.    J. MIHALYI    2,403,737
MOUNT FOR OPTICAL ELEMENTS
Filed Oct. 10, 1942
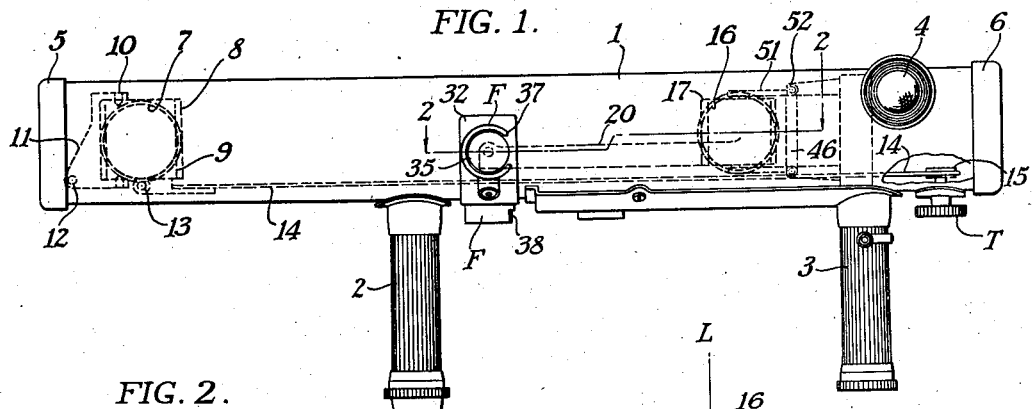
JOSEPH MIHALYI
INVENTOR
BY
ATTORNEYS Patented July 9, 1946

2,403,737

UNITED STATES PATENT OFFICE 2,403,737

MOUNT FOR OPTICAL ELEMENTS

Joseph Mihalyi, Rochester, N. Y., assignor to Eastman Kodak Company, Rochester, N. Y., a corporation of New Jersey Application October 10, 1942, Serial No. 461,584

8 Claims. (Cl. 88—2.7)

This invention relates to a mount for an optical element and it is particularly adapted for use as an optical element mount for range finders. One object of my invention is to provide a mount which will accurately position an optical element in the required position. Another object of my invention is to provide a movable mount for an optical element which can be readily adjusted to the proper position and which may be moved in two directions. Still another object of my invention is to provide a readily adjustable mount for a movable mirror or prism of a range finder. Other objects will appear from the following specifications, the novel features being particularly pointed out in the claims at the end thereof.

In optical instruments it is usually necessary to provide a means for holding the optical elements with extreme accuracy, and where these optical elements are to be moved, as for instance, for deflecting light rays for use in a range finder, it is necessary to provide a mount which will not only permit the optical element to move through its required path, but a mount which can also be readily adjusted both in the initial setting up of the instrument and for adjusting the instrument in the field. It is well known that different atmospheric conditions and temperatures may be sufficient to get optical elements of range finders and the like sufficiently out of adjustment to prevent not only accurate reading but in some instances to even prevent any readings at all. It is, therefore, necessary to provide some means of bringing the parts back into their proper operative relationship and in the following application I will describe a preferred form of mount for optical elements of a range finder which will fulfill these requirements of easy, yet accurate, adjustment of the parts at any time.

Coming now to the drawing wherein like reference characters denote like parts throughout:

Fig. 1 is a rear elevation of a typical range finder constructed in accordance with and embodying an optical element and mount constructed in accordance with a preferred form of my invention;

Fig. 2 is an enlarged detail section showing the mount in top plan and taken on line 2—2 of Fig. 1;

Fig. 3 is an enlarged fragmentary detail section taken on line 33 of Fig. 2 showing a portion of the optical element adjusting mechanism; and Fig. 4 is a fragmentary perspective view of the optical element mount removed from its casing.

My preferred mount comprises broadly a carrier for an optical element which is pivoted about axes extending in two directions at one end and which is provided with a pair of adjusting screws at the opposite end, the axes of the adjusting screws being parallel to the pivotal axis of the mount. Thus, in aligning an image, the mount can be moved accurately and minutely if desired in two different directions and the movement in both directions can be controlled with a high degree of accuracy.

Referring to Fig. 1, the range finder may comprise a casing 1 provided with a pair of supporting handles 2 and 3 and having a rear sight or opening 4 through which the images of an object being focused upon may be viewed. The casing 1 may be provided with end caps 5 and 6. In one end of the range finder there is an opening 7 through which light rays may pass to a mirror 8 which is hingedly carried by a frame 9, this frame in turn being hingedly attached at 10 to a bracket 11 pivotally attached at 12 to the casing 1. A pivotal connection 13 is formed between the frame 9 and an arm 14 extending through the casing and contacting with a cam 15 which may be turned by the thumb wheel T adjacent handle 3.

Thus an image coming through the window 7 may be reflected by the mirror 8 so that this image can be made to overlie a second image coming in through a second window device to determine the point of focus. As thus far described, the general type of range finder is known.

However, the image which is brought through the window 16, as best shown in Fig. 2, may be refracted by an optical element, such as a mirror 17 or a prism, so that light rays may be reflected from the line L by the mirror 17 to a suitable objective 18 which brings them to focus at the proper plane not shown. By moving the mirror 8 through the focusing knob T two images may be made to coincide, since in this instance the mirror 17 is both reflecting and transmitting, so that the light rays reflected by the mirror 8 may pass along the axis L' and through the mirror 17.

In order to properly set up the instrument and, in addition, in order to adjust the instrument whenever necessary, I have provided a mount best shown in Figs. 3 and 4 by which the relation of the mirror 17 may be adjusted so that the images passing along the lines L and L' may be registered to indicate the focal distance on a suitable scale not shown but which may be seen through the eyepiece 4.

This mount consists of an arm 20 which, as shown in Fig. 3, may have one end substantially L-shaped in cross-section having a substantially vertical arm 21 and a substantially horizontal arm 22, each of which is provided with accurately ground or prepared surfaces 23 and 24. A convenient way of making these surfaces is to provide a protuberance which can be accurately faced so that the two surfaces are accurately at right angles.

The arm 20 is provided with a lug 25 to which a spring 26 may be attached, this spring being also attached to the casing at 27. Thus the spring 26 always tends to move the adjustable end of the arm 20 in the direction shown by the arrow in Fig. 3.

Opposing this movement is a pair of adjusting screws 28 and 29, these screws having a threaded connection at 30 and 31 with a supporting plate 32 which may be attached by screws 33 to the casing 1. The screws 28 and 29 have knurled or roughened knobs 35 and 36 which can be turned through the relatively small openings 37 and 38 in the protecting flanges F, so that it will be difficult if not impossible for either of these two screws to be turned by accident.

The arm 20 is pivoted on the axis A—A by means of pivots 40 and 41 passing from ears 42 and 43 into similar ears 44 and 45 carried by a bracket designated broadly as 46.

The frame 39 has a number of mirror carrying elements 47 so that the mirror 17 may be held in a fixed position with respect to the frame 39 which is cut out at 48 to permit light rays to pass through the mirror 17 from the mirror 7.

The bracket 46 may be a circular member carrying a lower arm 50 supporting the pivotal pin 41 and carrying an upper arm 51 supporting the pivot 40. Thus the arms 50 and 51 are connected together by the circular bracket 46. Integrally formed with this bracket is a pivot 52 having an axis B—B at right angles to the axis A—A. Because of this pivotal mount the arm 20 may be moved in either one of two directions by adjusting the operating knobs 35 and 36. When the knob 36 is turned by turning the screw having an axis b—b, the arm 20 is turned about the axis B—B and when the knob 35 is turned about the axis a—a the arm 20 is turned about its axis A—A. Thus, since the adjusting screws 35 and 36 are parallel to the two axes about which the arm 20 may turn, it is only necessary to turn one or both of these screws if for any reason the instrument should get out of adjustment in the field as they frequently do because of temperature changes or other changes in the operating conditions. These two screws may also be used in initially setting up the instrument after properly aligning the mirror 8 so that the mirror 17 may be properly adjusted with respect to the mirror 8. This can be done by focusing the instrument on infinity or perhaps some other known distance and adjusting the two mirrors so that images, one passing through and the other reflected by the mirror 17, may be brought accurately into registration.

Such an adjustment is used in a range finder completely shown in my copending application Serial No. 461,585 filed October 10, 1942, and reference may be had to this application for details not described herein. Reference may also be had to the following applications in which I have disclosed optical systems of a type suitable for use in a range finder of the present type: Range finder, case B, Serial No. 472,832, filed January 19, 1943; Range finder, case F, Serial No. 479,096, filed March 13, 1943; Range finder, case G, Serial No. 479,097, filed March 13, 1943. Since the present application is limited to a mount for an optical element, it was not deemed necessary to further describe the structure of the range finder which is fully described in the application above referred to.

What I claim is:

1. A mount for optical elements for range finders on which the elements may move in two directions, comprising an optical element, an arm support therefor, means for holding the optical element on one end of the arm, a pivotal mount for the arm about which the arm may turn in one direction, said pivotal mount including a bracket, a pivotal mount for the bracket on which the arm and bracket may turn in another direction, at least a portion of said arm extending from said pivotal mount and including a pair of surfaces, one arranged parallel to the axis of the arm pivotal mount and the other arranged parallel to the axis of the bracket pivotal mount, an adjustable support for both of said surfaces whereby the inclination of the arm about its two pivotal axes may be altered.

2. A mount for optical elements for range finders on which the elements may move in two directions, comprising an optical element, an arm support therefor, means for holding the optical element on one end of the arm, a pivotal mount for the arm about which the arm may turn in one direction, said pivotal mount including a bracket, a pivotal mount for the bracket on which the arm and bracket may turn in another direction, at least a portion of said arm extending from said pivotal mount and including a pair of surfaces, one arranged parallel to the axis of the arm pivotal mount and the other arranged parallel to the axis of the bracket pivotal mount, a spring tending to move the pair of surfaces in one direction, a pair of adjusting members, one for opposing the movement of each arm surface whereby the inclination of the arm carrying the optical element may be moved in two directions on said arm.

3. A mount for refracting optical elements for range finders comprising an elongated arm, means for supporting one end of the arm on two different axes at right angles to each other, a pair of adjusting screws adjacent the other end of the arm and parallel to the two different axes supporting the opposite end of the arm, and accurately formed surfaces resting against said adjusting screws whereby said screws may move said arm in two directions.

4. A mount for refracting optical elements for range finders comprising an elongated arm, means for supporting one end of the arm on two different axes at right angles to each other, a pair of adjusting screws adjacent the other end of the arm and parallel to the two different axes supporting the opposite end of the arm, and accurately formed surfaces resting against said adjusting screws whereby said screws may move said arm in two directions, and a single spring for holding the accurately formed arm surfaces against the adjusting screws.

5. A mount for refracting optical elements for range finders comprising an elongated arm, means for supporting one end of the arm on two different axes at right angles to each other, a pair of adjusting screws adjacent the other end of the arm and parallel to the two different axes supporting the opposite end of the arm, and accurately formed surfaces resting against said adjusting screws whereby said screws may move said arm in two directions, and a single spring substantially bisecting the angle of the two screws for holding the accurately formed arm surfaces against the adjusting screws.

6. A mount for refracting optical elements for range finders comprising an elongated arm, means for supporting one end of the arm on two different axes at right angles to each other, a pair of adjusting screws adjacent the other end of the arm and parallel to the two different axes supporting the opposite end of the arm, and accurately formed surfaces resting against said adjusting screws whereby said screws may move said arm in two directions and a single spring for holding the accurately formed arm surfaces against the adjusting screws, a screw support comprising threaded apertures for the screws, knurled heads on the screws, and semi-cylindrical guards extending at least partially about the knurled heads to prevent accidental operation thereof.

7. A mount for refracting optical elements for range finders comprising an elongated arm, means for supporting one end of the arm on two different axes at right angles to each other, a pair of adjusting screws adjacent the other end of the arm and parallel to the two different axes supporting the opposite end of the arm, and accurately formed surfaces resting against said adjusting screws whereby said screws may move said arm in two directions, and a single spring for holding the accurately formed arm surfaces against the adjusting screws, each screw including a knurled head, and a screw support including a sleeve partially encircling the screw head and exposing only a small area thereof for adjusting the screw.

8. A mount for refracting optical elements for range finders comprising an elongated arm including means for attaching the optical element at one end, two accurately formed and angularly disposed surfaces on the other end, a pair of pivotal mounts for the arm, one parallel to each accurately formed surface, the axes of the pivotal mounts and the accurately formed surfaces being at right angles to each other, a spring substantially bisecting the right angle and tending to move the arm about its pivots, a pair of adjusting screws arranged at right angles, one positioned to contact with each accurately formed arm surface, and means for turning the screws independently to move the arm against said spring.

JOSEPH MIHALYI.